(12) United States Patent
Teigen

(10) Patent No.: US 9,097,817 B2
(45) Date of Patent: Aug. 4, 2015

(54) SEISMIC SENSOR CABLE

(75) Inventor: Oeyvind Teigen, Oslo (NO)

(73) Assignee: WESTERNGECO L.L.C., Houston, TX (US)

(*) Notice: Subject to any disclaimer, the term of this patent is extended or adjusted under 35 U.S.C. 154(b) by 1435 days.

(21) Appl. No.: 12/164,715

(22) Filed: Jun. 30, 2008

(65) Prior Publication Data

US 2009/0323468 A1 Dec. 31, 2009

(51) Int. Cl.
*G01V 1/38* (2006.01)
*G01V 1/20* (2006.01)

(52) U.S. Cl.
CPC ........................... *G01V 1/201* (2013.01)

(58) Field of Classification Search
USPC .............................. 367/15, 20, 154
See application file for complete search history.

(56) References Cited

U.S. PATENT DOCUMENTS

| | | | | |
|---|---|---|---|---|
| 4,638,469 A | * | 1/1987 | Bryant et al. | 367/154 |
| 5,404,340 A | * | 4/1995 | Weichart et al. | 367/20 |
| 6,477,111 B1 | * | 11/2002 | Lunde et al. | 367/20 |
| 6,879,546 B2 | * | 4/2005 | Halvorsen et al. | 367/166 |
| 7,298,672 B1 | | 11/2007 | Stenzel et al. | |
| 7,545,703 B2 | * | 6/2009 | Lunde et al. | 367/20 |
| 2004/0013036 A1 | | 1/2004 | Fageras et al. | |
| 2007/0258320 A1 | | 11/2007 | Tenghamn et al. | |
| 2008/0008034 A1 | | 1/2008 | Tenghamn et al. | |
| 2008/0008047 A1 | | 1/2008 | Lunde et al. | |
| 2008/0186803 A1 | * | 8/2008 | McKey et al. | 367/15 |

OTHER PUBLICATIONS

A.P. Dowling, Underwater Flow Noise, Theoretical and Computational Fluid Dynamics, 1998, vol. 10, pp. 135-153.
PCT Search Report, dated Feb. 2, 2010, Application No. PCT/US2009/047085.

* cited by examiner

*Primary Examiner* — Krystine Breier

(57) ABSTRACT

An apparatus includes a cable; and seismic sensors that are disposed in the cable. The apparatus also includes spacers that are distributed in the cable such that each seismic sensor is disposed in an interval of the cable separating a different adjacent pair of the spacers. The spacers of each pair are separated by at least twenty-five centimeters.

10 Claims, 5 Drawing Sheets

SEISMIC SENSOR CABLE

BACKGROUND

The invention generally relates to a seismic sensor cable, such as a streamer, for example.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, an apparatus includes a cable; and seismic sensors that are disposed in the cable. The apparatus also includes spacers that are distributed in the cable such that each seismic sensor is disposed in an interval of the cable separating a different adjacent pair of the spacers. The spacers of each pair are separated by at least twenty-five centimeters.

In another embodiment of the invention, a technique includes disposing seismic sensors in a cable and distributing spacers in the cable such that each seismic sensor is disposed in an interval of the cable separating a different adjacent pair of the spacers. The technique includes separating the spacers of each pair by at least twenty-five centimeters.

In another embodiment of the invention, an apparatus includes a cable that includes a skin and a seismic sensor that is disposed in the cable. The apparatus also includes a spacer that is disposed in the cable. The spacer includes at least one extended portion to support the skin and at least one recessed portion to form a region between the spacer and the skin to receive a filler material.

In yet another embodiment of the invention, a technique includes disposing seismic sensors and spacers inside a cable. For each spacer, at least one portion of the spacer is extended to support a skin of the cable and at least one portion of the spacer is recessed to receive a filler material between the spacer and the skin.

Advantages and other features of the invention will become apparent from the following drawing, description and claims.

DETAILED DESCRIPTION

Figure 1:
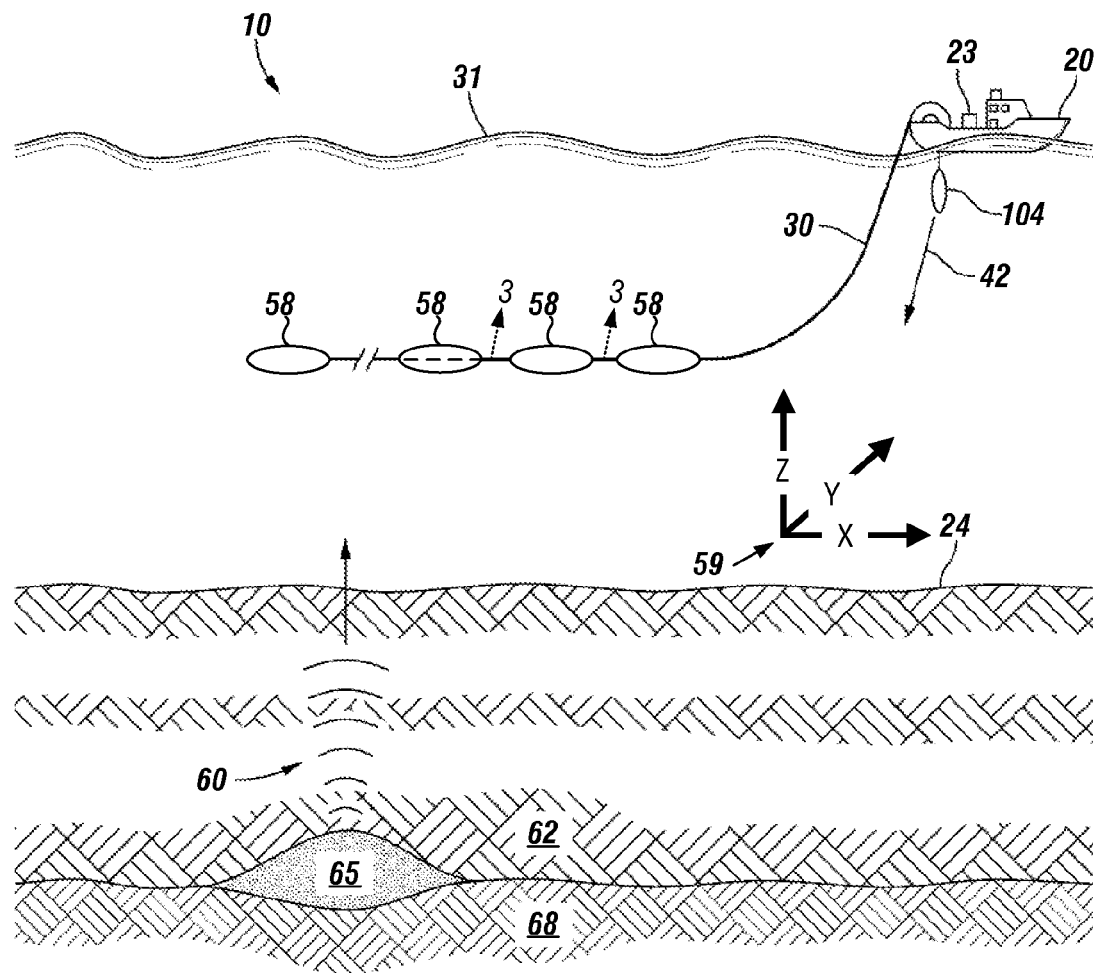
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 104 that may be formed from one or more seismic source elements, such as air guns, for example, which are connected to the survey vessel 20. Alternatively, in other embodiments of the invention, the seismic source 104 may operate independently of the survey vessel 20, in that the seismic source 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

The main mechanical parts of a conventional streamer typically include skin (the outer covering); one or more stress members; seismic sensors; spacers to support the skin and protect the seismic sensors; and a filler material. In general, the filler material typically has a density to make the overall streamer neutrally buoyant; and the filler material typically has properties that make the material acoustically transparent and electrically non-conductive.

Certain fluids (kerosene, for example) possess these properties and thus, may be used as streamer filler materials. However, a fluid does not possess the ability to dampen vibration, i.e., waves that propagate in the inline direction along the streamer. Therefore, measures typically are undertaken to compensate for the fluid's inability to dampen vibration. For example, the spacers may be placed either symmetrically around each seismic sensor (i.e., one spacer on each side of the sensor); or two sensors may be placed symmetrically about each spacer. The vibration is cancelled by using two spacers symmetrically disposed about the seismic sensor because each spacer sets up a pressure wave (as a result of inline vibration), and the two waves have opposite polarities, which cancel each other. Two seismic sensors may be disposed symmetrically around one spacer to achieve a similar cancellation effect, but this approach uses twice as many sensors. Furthermore, the latter approach may degrade performance due to nonsymmetrical positioning of the other seismic sensors.

When gel is used as the filler material, the noise picture changes, as flow noise (instead of vibration) becomes the dominant noise source. More specifically, the main mechanical difference between fluid and gel as a filler material is the shear stiffness. A fluid has zero shear stiffness, and shear stresses from viscous effects typically are negligible. The shear stiffness is what makes a gel possess solid-like properties. It has been discovered through modeling that the shear stiffness of the gel degrades the averaging of flow noise. The degradation in the flow noise cancellation may be attributable to relatively little amount of gel being effectively available to communicate the pressure between each side of the spacer.

In accordance with embodiments of the invention described herein, the streamer 30 is filled with a gel-based filler material. Techniques and structures are described herein for purposes of increasing the volume, area and/or length of continuous gel, which is available for effectively canceling flow noise that is introduced by turbulent pressure fluctuations.

Figure 2:
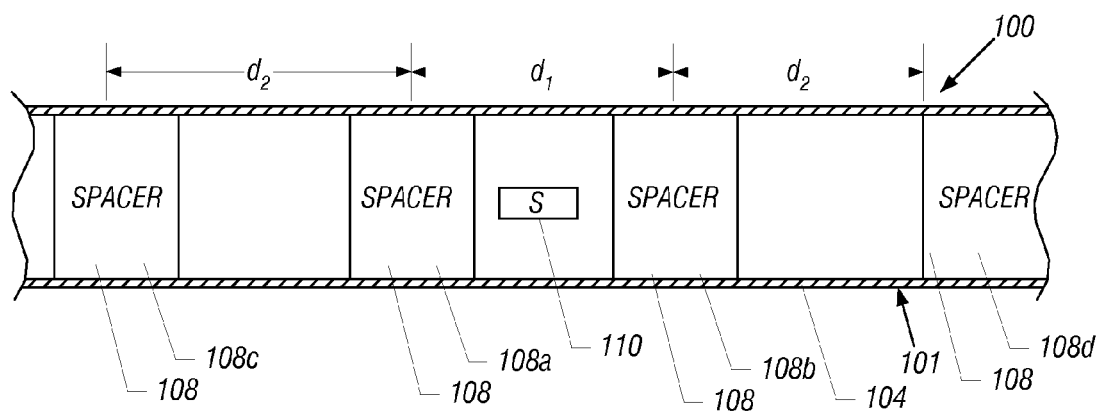
FIG. 2 is a cross-sectional view of a streamer of the prior art.

One way to increase the gel available for noise cancellation involves increasing the separation between spacers, as compared to the spacer separation used in streamers of the prior art. More specifically, FIG. 2 depicts a conventional streamer 100, which includes spacers 108 (spacers 108*a*, 108*b*, 108*c* and 108*d*, being depicted as examples) that are located inside a cable 101 of the streamer 100. The spacers 108 are primarily used to support an outer skin 104 of the cable 101 and protect the seismic sensors (such as an exemplary seismic sensor 110) of the streamer 100. As depicted in FIG. 2, conventionally, the spacers 108 may have two different spacings: a first smaller center-to-center spacing distance (called "$d_1$" in FIG. 2) when the spacers 108 straddle a seismic sensor (such as the exemplary sensor 110) and a larger center-to-center spacing distance (called "$d_2$" in FIG. 2) when no seismic sensor is located in between. As depicted in FIG. 2, the spacers 108*a* and 108*b* are located on either side of a seismic sensor 110 and are separated by the distance $d_1$, which is less than the distance $d_2$ between the spacers 108*c* and 108*a* or the distance $d_2$ between the spacers 108*b* and 108*d*.

As a specific example, conventionally, the distance $d_2$ may be approximately 240 to 260 millimeters (mm), and the distance $d_1$ may be approximately 140 to 160 mm.

It has been discovered through simulations that for a gel-filled streamer, acceptable noise cancellation may be achieved by moving the spacers farther away from the seismic sensors. More specifically, the distances between the spacers and the seismic sensors may be increased, which provides more volume of the gel-based filler material for noise cancellation, while still providing sufficiently close sensor-to-spacer separation to protect the seismic sensors.

Figure 3:
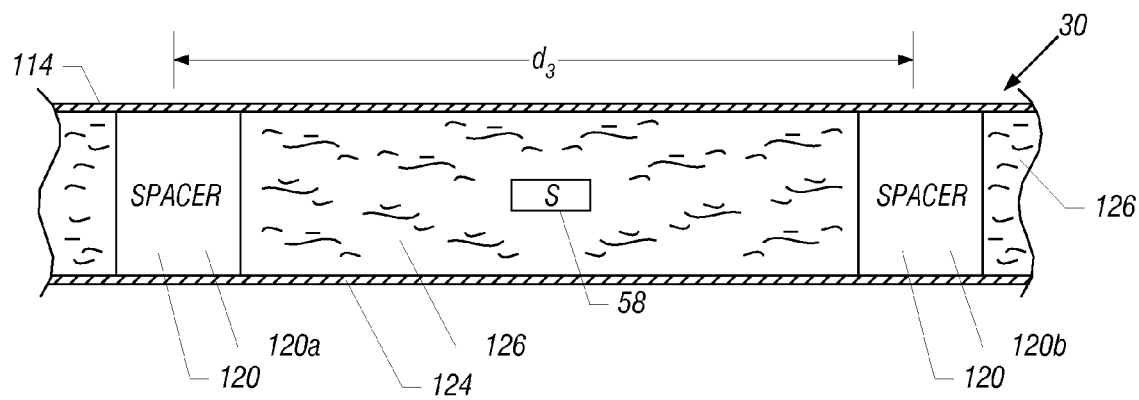
FIG. 3 is a cross-sectional view taken along line 3-3 of FIG. 1 according to an embodiment of the invention.

FIG. 3 depicts an exemplary embodiment of the streamer 30 in accordance with some embodiments of the invention. The cross-sectional view depicted in FIG. 3 is simplified, in that communication and support lines of the streamer 30 are not depicted, for purposes of clarifying the relationship of the spacers and seismic sensors.

In general, the streamer 30 includes a cable 114, which has an outer skin 124, and in general, the outer skin 124 defines an interior space that is filled with a gel-based filler material 126. The streamer 30 contains seismic sensors 58 (one seismic sensor 58 being depicted in FIG. 3 as an example), which may be multicomponent and/or pressure sensors, depending on the particular embodiment of the invention. To support the outer skin 124 and protect the seismic sensors 58, the streamer 30 contains spacers 120, which are distributed along the length of the cable 114. Two exemplary spacers 120a and 120b of the streamer 30 are depicted in FIG. 3.

As depicted in FIG. 3, the spacers 120a and 120b are adjacent spacers 120, are located on either side of the seismic sensor 58 and are separated from each other by a center-to-center spacing distance (called "$d_3$" in FIG. 3). The distance $d_3$ is significantly greater than the center-to-center distance $d_1$ (see FIG. 2) between the spacers 108a and 108b of a conventional streamer. Due to the increased spacing distance $d_3$, more of the gel-based filler material 126 is available to attenuate flow noise.

As a more specific example, in accordance with some embodiments of the invention, the distance $d_3$ may be greater than 25 centimeters (cm), and as a more specific example, the distance $d_3$ may be approximately 60 cm, in accordance with some embodiments of the invention.

Depending on the particular embodiment of the invention, the spacer spacing may vary, depending on whether the spacers 120 are in proximity to a seismic sensor 58. More specifically, in accordance with some embodiments of the invention, the spacers 120 may be more closely spaced together (at a spacing of 25 cm or greater) when disposed on either side of the seismic sensor 58. However, when no seismic sensor 58 is disposed in between, the spacers 120 may be moved even farther apart. In other embodiments of the invention, the spacers 120 may be uniformly spaced apart (i.e., a spacing of at least 25 cm between adjacent spacers 120) along the entire length of the streamer 30. Thus, many variations are contemplated and are within the scope of the appended claims.

Figure 4:
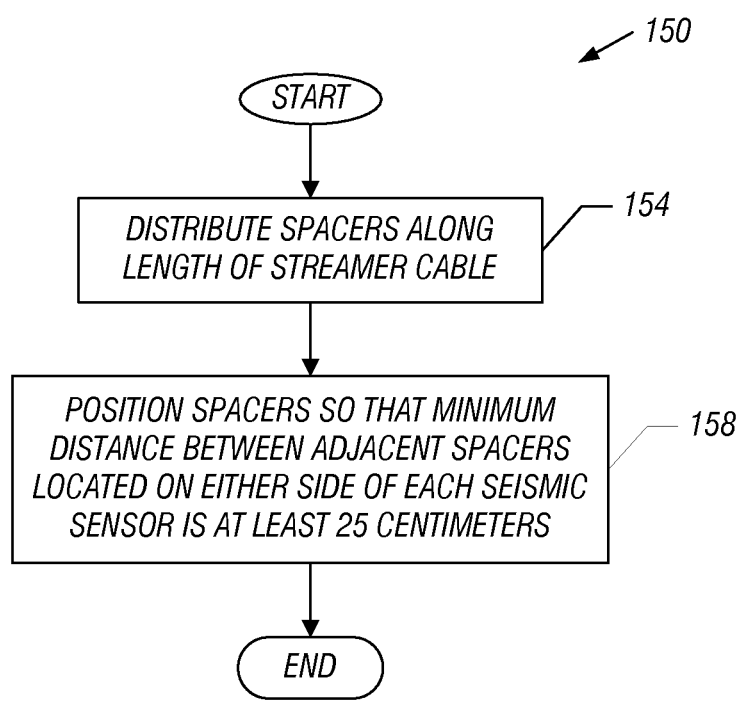
FIG. 4 is a flow diagram depicting a technique to reduce flow noise in a gel-filled streamer according to an embodiment of the invention.

To summarize, FIG. 4 depicts a technique 150 in accordance with embodiments of the invention. Pursuant to the technique 150, spacers are distributed (block 154) along the length of a streamer cable. The spacers are positioned (block 158) so that a minimum distance between adjacent spacers located on either side of a seismic sensor is at least 25 cm.

Figure 5:
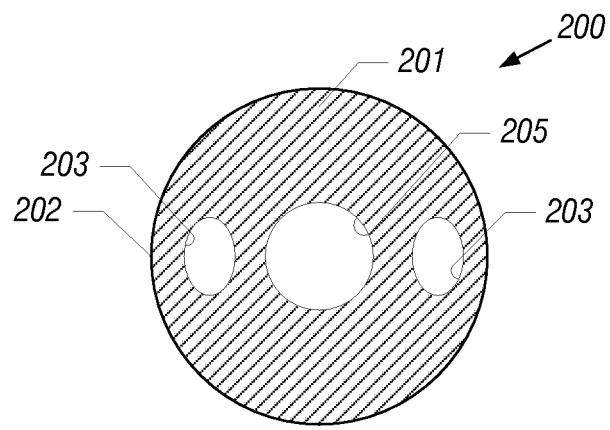
FIG. 5 is a cross-sectional view of a spacer of a streamer of the prior art.
Figure 6:
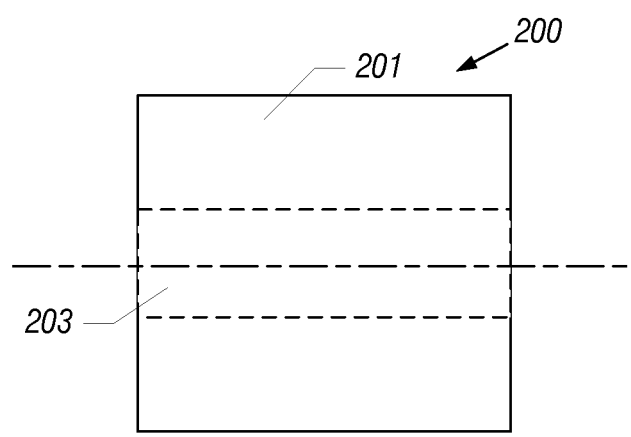
FIG. 6 is a side view of the spacer of FIG. 5.

Another technique to increase the amount of gel available to attenuate flow noise involves specifically constructing the spacer to receive and communicate gel between either side of the spacer. Such a spacer construction is to be contrasted to a spacer 200 of the prior art, which is depicted in a cross-sectional view in FIG. 5 and in a side view of FIG. 6. More specifically, the conventional spacer 200 generally has a body 201 with a cylindrical cross-section and openings 205 and 203 to route communication and structural lines, respectively, through the spacer 200. The spacer 200 is designed so that an outer surface 202 of the body 201 contacts and generally supports the outer skin of the streamer along the entire outer periphery of the body 201. However, such a design limits the amount of gel, which is available to attenuate flow noise.

Figure 7:
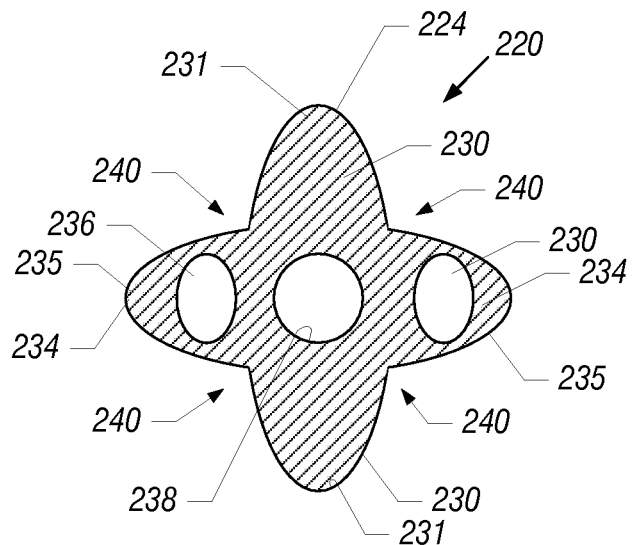
FIG. 7 is a cross-sectional view of a spacer of a streamer according to an embodiment of the invention.

Referring to FIGS. 7 (depicting a cross-sectional view) and 8 (depicting a side view), contrary to conventional arrangements, a spacer 220 in accordance with embodiments of the invention may be formed from a spacer body 224, which has radially recessed regions 240 for purposes of communicating gel between either side of the spacer 220. In this regard, in accordance with some embodiments of the invention, the spacer body 224 includes vertically extending arms 230 and horizontally extending arms 234, which generally form a T-shaped structure for supporting the outer skin of the streamer 30. Thus, at their upper and lower ends, the arms 230 have surfaces 231 that contact the interior surface of the outer skin of the streamer 30; and similarly, the horizontally extending arms 234 have contact surfaces 235 for purpose of contacting the inner surface of the outer skin of the streamer 30. However, the contact between the outer surface of the spacer body 224 and the inner surface of the outer skin is not continuous, thereby creating the recessed regions 240, which receive and communicate the gel-based filler material between either side of the spacer 220.

Figure 8:
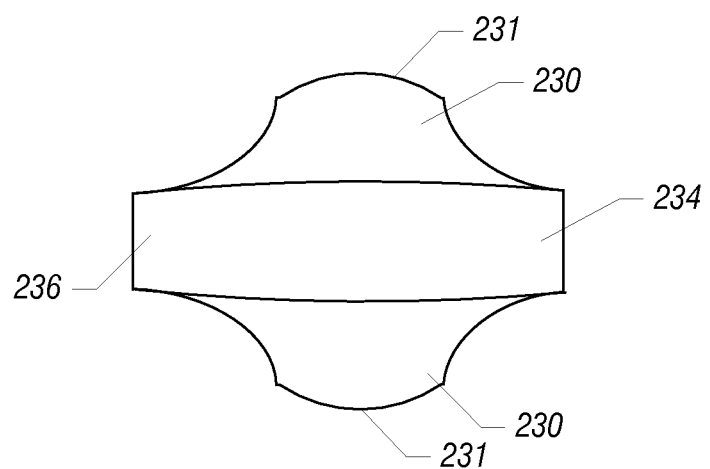
FIG. 8 is a side view of the spacer of FIG. 7 according to an embodiment of the invention.

The spacers may have other shapes other than the shape depicted in FIGS. 7 and 8 for purposes of creating a sufficient volume of gel-based filler material to attenuate flow noise, in accordance with other embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
a cable;
seismic sensors disposed in the cable; and
spacers distributed in the cable such that each seismic sensor is disposed in an interval of the cable separating a different adjacent pair of the spacers,
wherein the spacers of each pair are separated by at least twenty-five centimeters.

2. The apparatus of claim 1, further comprising:
a gel-based filler material in the cable.

3. The apparatus of claim 1, wherein the cable comprises a streamer.

4. The apparatus of claim 1, wherein the spacers include other pairs of spacers that are not separated by intervals of the cable that include one of the seismic sensors and the spacers of each of the other pairs are separated by at least twenty-five centimeters.

5. The apparatus of claim 1, wherein the spacers of each pair are separated by substantially sixty centimeters.

6. The apparatus of claim 1, further comprising:
a vessel to tow the cable.

7. A method comprising:
disposing seismic sensors in a cable;
distributing spacers in the cable such that each seismic sensor is disposed in an interval of the cable separating a different adjacent pair of the spacers; and
separating the spacers of each pair by at least twenty-five centimeters.

8. The method of claim 7, further comprising:
filling the cable with a gel-based material.

9. The method of claim 7, wherein the act of disposing spacers comprises varying a spacing of the sensors based on locations of the sensors.

10. The method of claim 7, wherein the spacing is substantially sixty centimeters.

* * * * *